United States Patent
Hosono (10) Patent No.: US 8,483,767 B2
(45) Date of Patent: Jul. 9, 2013

(54) PORTABLE INFORMATION TERMINAL APPARATUS, MOBILE WIRELESS TERMINAL APPARATUS, AND SENSOR CONTROL METHOD

(75) Inventor: Masafumi Hosono, Kunitachi (JP)

(73) Assignee: Fujitsu Mobile Communications Limited, Kawasaki (JP)

(*) Notice: Subject to any disclaimer, the term of this patent is extended or adjusted under 35 U.S.C. 154(b) by 722 days.

(21) Appl. No.: 12/352,800

(22) Filed: Jan. 13, 2009

(65) Prior Publication Data
US 2009/0233650 A1     Sep. 17, 2009

(30) Foreign Application Priority Data
Mar. 11, 2008  (JP) .................................. 2008-061460

(51) Int. Cl.
*H04M 1/00*  (2006.01)
(52) U.S. Cl.
USPC ..... 455/566; 455/574; 455/127.1; 455/127.5; 455/343.1; 455/343.2; 345/211; 345/52; 345/173; 345/156; 345/174; 345/157; 715/856; 715/857; 715/858

(58) Field of Classification Search
USPC ..... 455/566, 574, 127.1, 127.5, 343.1–343.6; 345/158, 173–178, 211, 52, 156, 168, 649, 345/157, 169; 715/856, 857, 858
See application file for complete search history.

(56) References Cited

U.S. PATENT DOCUMENTS

| | | | |
|---|---|---|---|
| 6,839,052 B1* | 1/2005 | Kramer | 345/173 |
| 7,978,176 B2* | 7/2011 | Forstall et al. | 345/158 |
| 2001/0013855 A1* | 8/2001 | Fricker et al. | 345/156 |
| 2007/0143707 A1* | 6/2007 | Yun et al. | 715/811 |

FOREIGN PATENT DOCUMENTS

JP  2006-302184 A  11/2006

* cited by examiner

*Primary Examiner* — Junpeng Chen
(74) *Attorney, Agent, or Firm* — Maschoff Brennan (57) ABSTRACT

A touch sensor detects contact input by a finger or the like, and includes two sensor modules. Each of the sensor modules has many sensors arrayed linearly. The operation state of each sensor module is set under the control of a control unit. When a user touches a sensor of the sensor module, the control unit energizes only the sensor which the user has touched and neighboring sensors to detect an input from the user, and does not energize the remaining sensors on the same sensor module.

18 Claims, 6 Drawing Sheets

Status of sensor { ▒▒▒ ··· Active / ▧▧▧ ··· Sleep }

Status of sensor { ▨ ··· Active / ▧ ··· Sleep }

PORTABLE INFORMATION TERMINAL APPARATUS, MOBILE WIRELESS TERMINAL APPARATUS, AND SENSOR CONTROL METHOD

CROSS-REFERENCE TO RELATED APPLICATIONS

This application is based upon and claims the benefit of priority from prior Japanese Patent Application No. 2008-061460, filed Mar. 11, 2008, the entire contents of which are incorporated herein by reference.

BACKGROUND OF THE INVENTION

1. Field of the Invention

The present invention relates to a portable information terminal apparatus such as a cellular phone or personal digital assistant (PDA).

2. Description of the Related Art

As is generally known, cellular phones, PDAs, portable music players, and the like have been equipped with various communication functions such as a display which visually conveys information to a user and a wireless LAN. Recently, an apparatus equipped with a touch panel display capable of receiving requests from a user has also been under development.

In a conventional portable information terminal apparatus, the touch panel display has a problem that the fingers of the user make it difficult for the user to see displayed information or sebum or the like attached to the display area upon operation makes it difficult to see displayed information. A conventional apparatus has a sensor, other than a touch panel, provided outside the display area to detect user requests with the sensor, thereby avoiding the above problem.

In the case of, for example, a rectangular display, if sensors are provided on all four sides, the standby power of the sensors increases the power consumption. If sensors are provided on only two orthogonal sides, operability deteriorates considerably depending on the dominant hand of a user. The standby power consumed by either of the sensors is a waste of battery power.

In addition, operation devices including key operation and touch sensors have been designed (see, e.g., Jpn. Pat. Appln. KOKAI Publication No. 2006-302184). Similar problems exist in these devices.

BRIEF SUMMARY OF THE INVENTION

The present invention has been made to solve the above problems, and has as its object to provide a portable information terminal apparatus, mobile wireless terminal apparatus, and sensor control method which reduce battery drain by contact sensors.

In order to achieve the above object, according to the present invention, there is provided a portable information terminal apparatus comprising:

display means for displaying information;

a sensor module including an array of a plurality of sensors which detect user operation;

display control means for controlling information displayed by the display means in accordance with a result detected by the sensor; and sensor control means for controlling operation of the sensors by controlling supply of power to the sensors and when there is a sensor which has detected an input from a user, continuing supply of power to the sensor and neighboring sensors and stopping supply of power to the remaining sensors.

As described above, according to the present invention, among the arrayed sensors, power is supplied only to a sensor which has detected an input and to neighboring sensors.

According to the present invention, therefore, there can be provided a portable information terminal apparatus, mobile wireless terminal apparatus, and sensor control method which reduce battery drain by contact sensors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the views of the accompanying drawing. A cellular phone will be described as an example of the portable information terminal apparatus according to the present invention.

Figure 1:
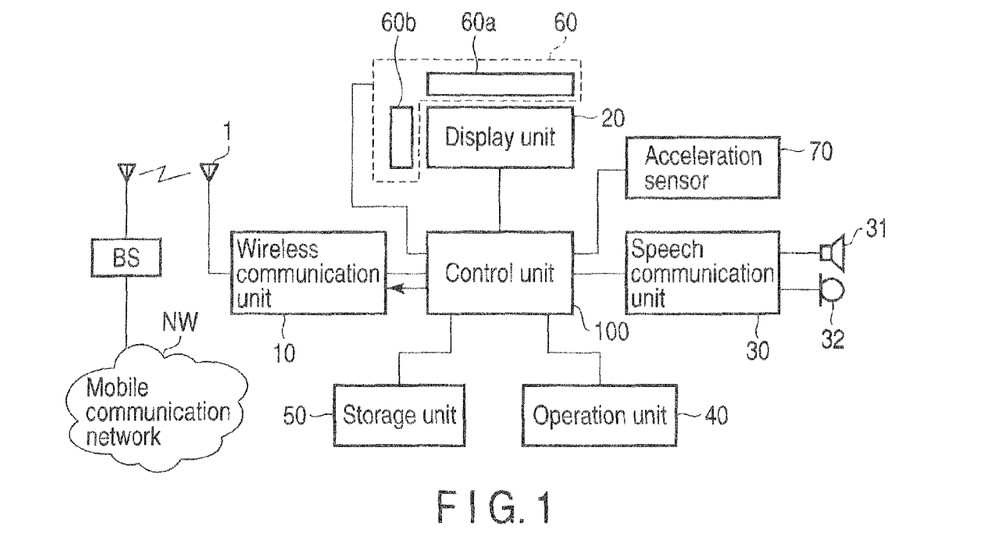
FIG. 1 is a circuit block diagram showing the arrangement of an embodiment of a portable information terminal apparatus according to the present invention.
Figure 2:
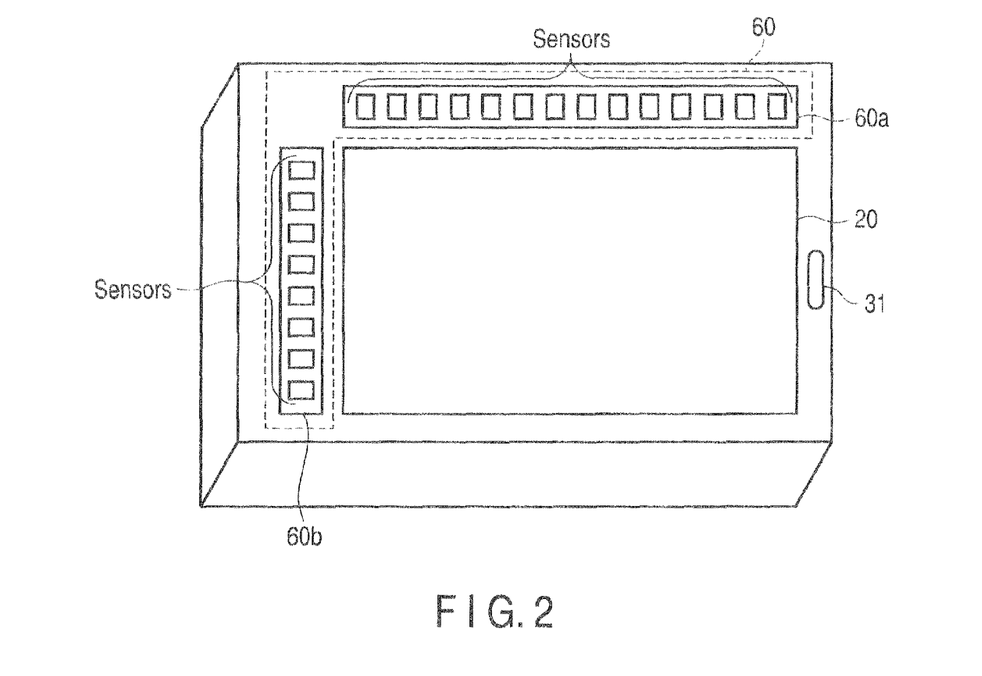
FIG. 2 is a perspective view of the portable information terminal apparatus shown in FIG. 1.

FIG. 1 is a block diagram showing the arrangement of a portable information terminal apparatus according to an embodiment of the present invention. As shown in FIG. 1, this portable information terminal apparatus comprises, as main constituent elements, an antenna 1, a wireless communication unit 10, a display unit 20, a speech communication unit 30, an operation unit 40, a storage unit 50, a touch sensor 60, an acceleration sensor 70, and a control unit 100. The apparatus performs communication via a base station apparatus BS and a mobile communication network NW. Assume that as shown in FIG. 2, the portable information terminal apparatus has a rectangular shape and comprises the rectangular display unit 20.

The wireless communication unit 10 wirelessly communicates with the base station apparatus BS accommodated in the mobile communication network NW in accordance with an instruction from the control unit 100, and performs transmission/reception of audio data, electronic mail data, and the like and reception of Web data, streaming data, and the like.

The display unit 20 is a display panel using a liquid crystal display (LCD) or organic electroluminescent (EL) display. The display unit 20 displays images (still and moving images), character information, and the like under the control of the control unit 100 and visually conveys information to the user.

The speech communication unit 30 is connected to a loudspeaker 31 and a microphone 32. The speech communication unit 30 outputs voice from a user, which is input via the microphone 32, to the control unit 100 upon converting the voice into voice data, and outputs the voice data received from a communication partner from the loudspeaker 31 upon decoding the data.

The operation unit 40 includes a plurality of key switches and the like, and receives an instruction from the user via them.

The storage unit 50 stores control programs and control data for the control unit 100, application software, address data made to correspond to the names, telephone numbers, or the like of communication partners, transmitted/received electronic mail data, Web data downloaded by Web browsing, streamed data, and the like.

The touch sensor 60 detects contact input by a finger or the like, and has two sensor modules 60a and 60b provided on two sides of the display unit 20 in different directions (horizontally and vertically) on the same plane as that of the display unit 20. Each of the sensor modules 60a and 60b comprises a linear array of many sensors, and each sensor is set to three statuses (sleep status, idle status, or active status) under the control of the control unit 100.

Note that when a finger of the user touches the sensor, the sensor capacitance changes because the capacitance of the human body or the like is added to it. The control unit 100 can detect a user request by detecting this change. More specifically, although the above capacitance is charged by a voltage applied from the control unit 100, since the voltage of the sensor with the charged capacitance changes with a change in capacitance, the control unit 100 can detect the contact of the user by detecting this change in charged voltage. As sensor mechanisms, various arrangements can be used. That is, the present invention is not limited to the above arrangement.

In this case, a sensor set to the active status and the idle status is, for example, in the on state, and operates when it is energized under the control of the control unit 100, and hence can detect contact by a finger or the like. A detection period Ta of the control unit 100 in the active status is shorter than a detection period Ti of the control unit 100 in the idle status. For example, detection period Ta=10 ms, and detection period Ti=100 ms. That is, power is consumed more in the active status than in the idle status. A sensor set to the sleep status is, for example, in the off state, and does not operate because it is not energized under the control of the control unit 100, and hence cannot detect any contact.

The acceleration sensor 70 detects the top/bottom orientation of the portable information terminal apparatus.

The control unit 100 comprises a microprocessor, operates in accordance with control programs and control data stored in the storage unit 50, and systematically controls the respective units of the portable information terminal apparatus, thereby implementing speech communication and data communication. The control unit 100 has a communication control function which operates in accordance with application software stored in the storage unit 50 to transmit/receive electronic mail, perform Web browsing, and display moving images on the display unit 20 on the basis of streamed data.

The control unit 100 also controls the display unit 20 to make it display information, and determines on the basis of the detection result obtained by the acceleration sensor 70 whether the user holds the portable information terminal apparatus in landscape or portrait orientation. The control unit 100 displays information on the display unit 20 in a proper top/bottom orientation in accordance with the orientation in which the apparatus is held.

The control unit 100 also includes a display control function of receiving a user request via the operation unit 40 or the touch sensor 60 and controlling information to be displayed on the display unit 20 in accordance with the received request. If, for example, the user sequentially slides his/her finger on a linear array of a plurality of sensors of the sensor module 60a (or 60b) in the array direction, the control unit 100 detects, from the order of detection by the respective sensors, the direction in which the user has slid his/her finger, and scrolls/displays the displayed image in the detected direction.

In addition, the control unit 100 includes a function of saving power required to drive the respective sensors by controlling the status of the respective sensors of the sensor modules 60a and 60b and further controlling the status of the respective sensors in accordance with the detection results obtained by the sensors.

The operation of the portable information terminal apparatus having the above arrangement will be described next. Display control corresponding to the detection result obtained by the touch sensor 60 and status control on the sensors constituting the touch sensor 60 will be described below in particular.

Figure 3:
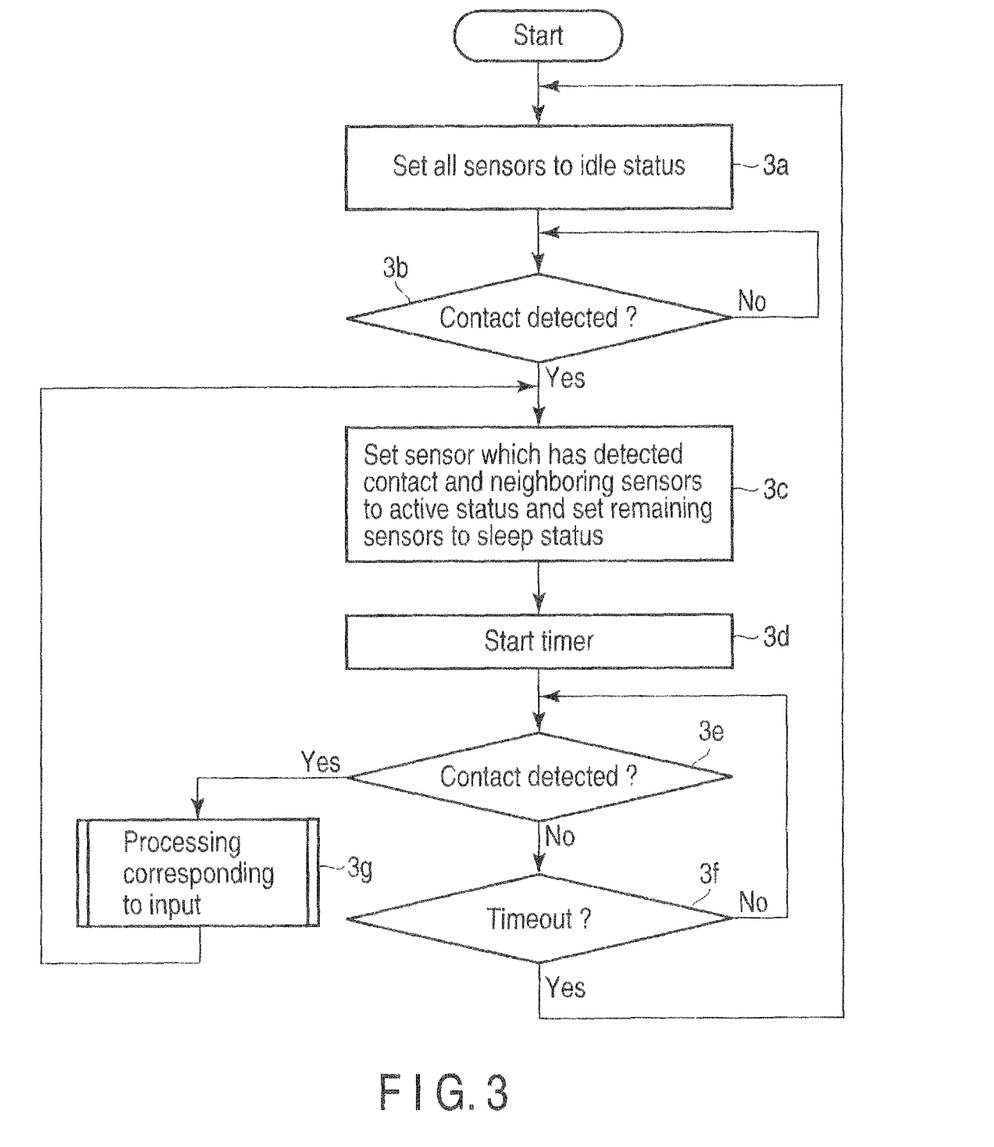
FIG. 3 is a flowchart showing control for the sensor modules of the portable information terminal apparatus shown in FIG. 1.

FIG. 3 is a flowchart showing these control operations. This processing is implemented when the control unit 100 operates on the basis of the control programs and control data stored in the storage unit 50. While the power supply of the portable information terminal apparatus is on, the processing is repeatedly executed. Concurrently with the control sequence to be described below, the control unit 100 determines the top/bottom orientation of the portable information terminal apparatus on the basis of the detection result obtained by the acceleration sensor 70, and executes the processing of displaying information so as to allow the user to properly and visually recognize the information in accordance with this determination result.

First, in step 3a, the control unit 100 sets each sensor of the sensor modules 60a and 60b to the idle status by energizing each sensor. The process then shifts to step 3b. In consequence, under the control of the control unit 100, all the sensors can detect contact, and wait for contact input from the user.

In step 3b, the control unit 100 monitors the sensors in the idle status, and determines from any of the sensors whether contact can be detected. If contact can be detected, the process shifts to step 3c. If contact cannot be detected, the process shifts to step 3b to continuously wait for contact input from the user.

In step 3c, the control unit 100 energizes the sensor which detected contact in step 3b or 3e and a preset number of (or a number corresponding to a preset proportion) sensors arranged near the sensor (adjacent sensors when the preset number is two) to set them to the active status. The control unit 100 stops energizing the other sensors on the same sensor module on which the sensors set to the active status are mounted to set them to the sleep status. The control unit 100 continues to energize the other sensor module to keep it in the active status (or the sleep status). The process then shifts to step 3d.

In step 3d, the control unit 100 activates a timer to start counting down a predetermined time. The process then shifts to step 3e. If the timer has already been activated when the process shifts to step 3d, the timer is restarted.

In step 3e, the control unit 100 determines whether contact is detected by the sensors set to the active status. If contact is detected, the process shifts to step 3g. If no contact is detected, the process shifts to step 3f.

In step 3f, the control unit 100 determines whether the timer activated in step 3d has timed out. If the timer has timed out, the process shifts to step 3a to set all the sensors to the idle status. If the timer has not timed out, the process shifts to step 3d to continue detection of contact.

In step 3g, the control unit 100 executes display control in accordance with the detection result obtained in step 3e. The process then shifts to step 3c. For example, the control unit 100 determines a scrolling direction and a scrolling speed from the relationship between the position of the sensor which previously detected contact in step 3e and the position of the sensor which has currently detected contact in step 3e. The control unit 100 then scrolls the displayed image and displays it in accordance with the determined direction and speed.

As described above, according to the portable information terminal apparatus having the above arrangement, when the user touches a sensor of the touch sensor 60, only the sensor which the user has touched and neighboring sensors are energized to detect inputs from the user, while the remaining sensors on the same sensor module are not energized. The portable information terminal apparatus having the above arrangement can therefore efficiently reduce the power consumption of the sensors during input operation.

Concurrently with this processing, the control unit 100 determines the top/bottom orientation of the portable information terminal apparatus on the basis of the detection result obtained by the acceleration sensor 70, and executes the processing of displaying information so as to allow the user to visually recognize it in accordance with the determination result.

Figure 4A:
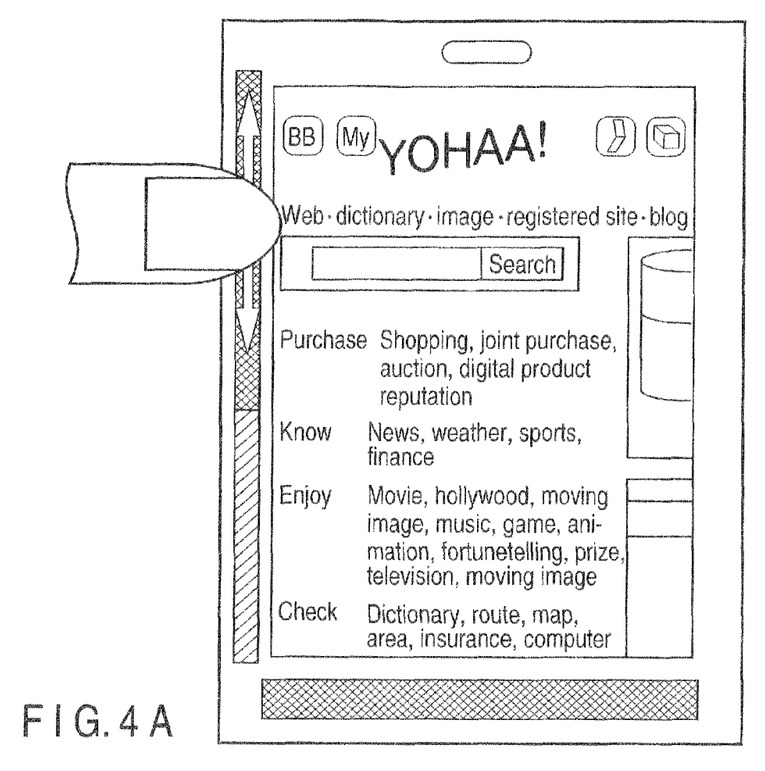
FIGS. 4A to 4D are views for explaining input operation corresponding to the control shown in FIG. 3.
Figure 4B:
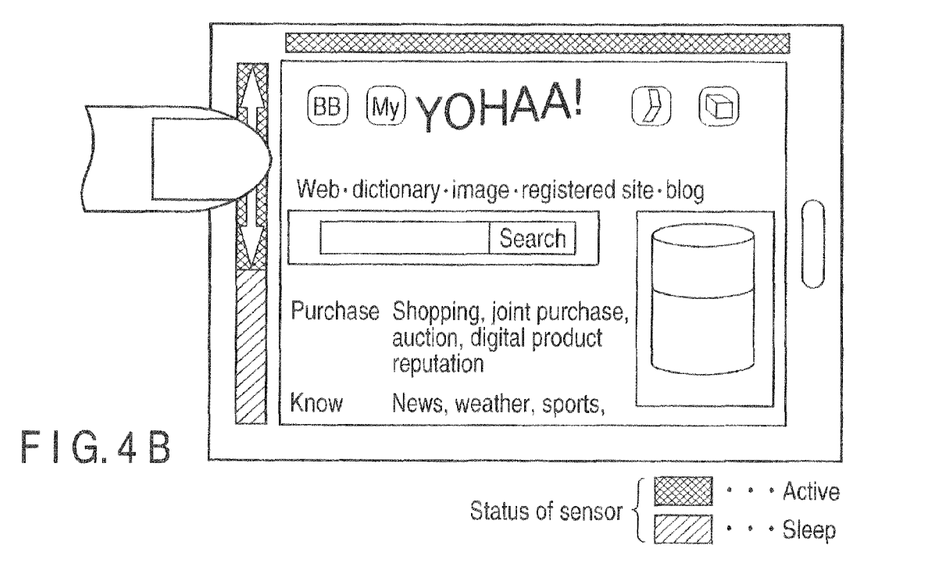

For this reason, even if the user changes the state in which the apparatus is held in portrait orientation as shown in FIG. 4A to the state in which the apparatus is held in landscape orientation as shown in FIG. 4B, the acceleration sensor 70 detects this change, and the control unit 100 properly displays information in accordance with the top/bottom orientation of the apparatus.

Figure 4C:
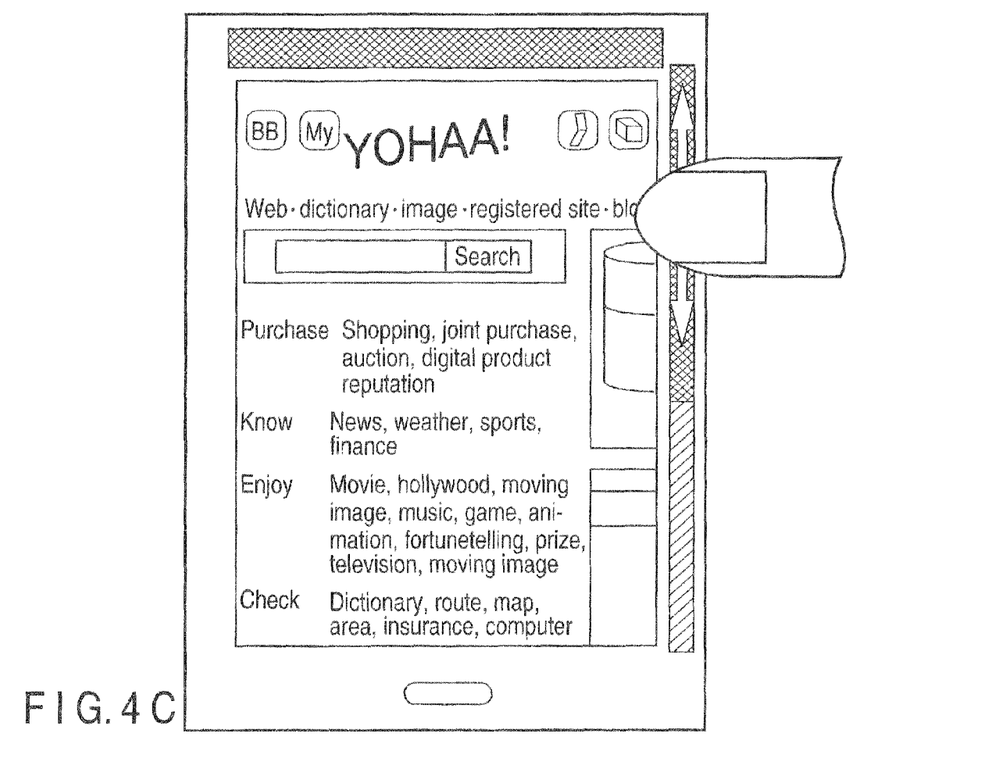
Figure 4D:
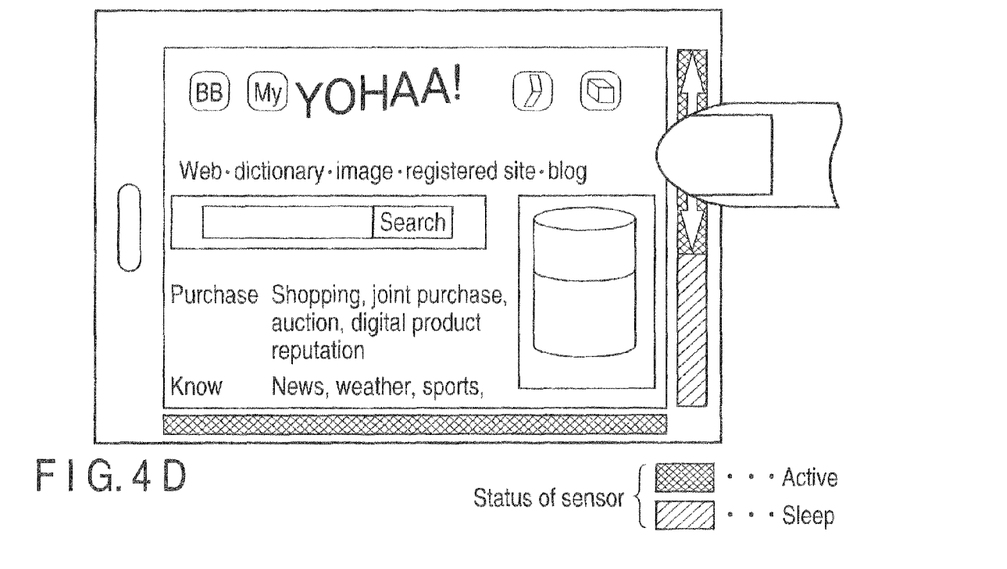

Assume also that the user changes the state in which the apparatus is held as shown in FIG. 4A such that the sensor modules 60a and 60b are respectively located on the left and at the bottom in the state in which the apparatus is held in an inverted position as shown in FIG. 4C such that the sensor modules 60a and 60b are respectively located on the right and at the top. Even in this case, the acceleration sensor 70 detects this change, and the control unit 100 can properly display information. That is, even if the user changes the positions of the sensor modules 60a and 60b depending on the dominant hand of the user, the apparatus can properly display information without inverting the top/bottom orientation. Note that the same applies to even a case in which the user changes the held position of the apparatus in the state shown in FIG. 4B to that in the state shown in FIG. 4D.

Note that the present invention is not limited to the above embodiments, and constituent elements can be variously modified and embodied at the execution stage within the spirit and scope of the invention. Various inventions can be formed by proper combinations of a plurality of constituent elements disclosed in the above embodiments. For example, several constituent elements may be omitted from all the constituent elements in each embodiment. In addition, constituent elements of the different embodiments may be combined as needed.

Figure 5:
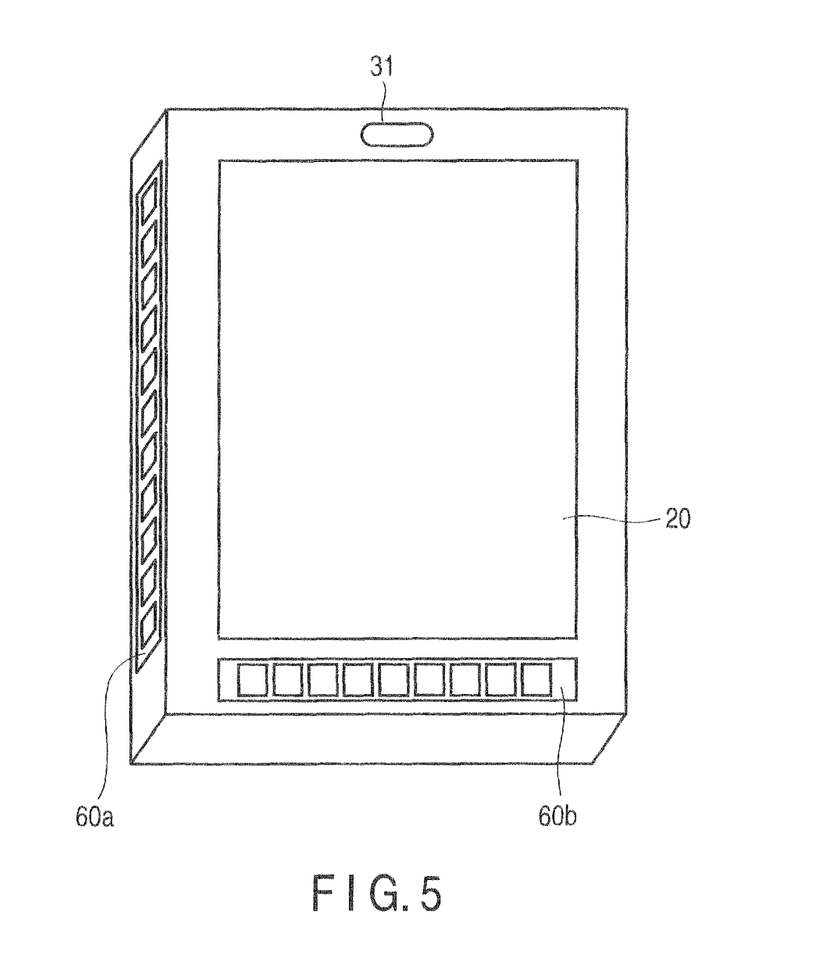
FIG. 5 is a perspective view for explaining the mounting positions of the sensor modules of the portable information terminal apparatus shown in FIG. 1.
Figure 6:
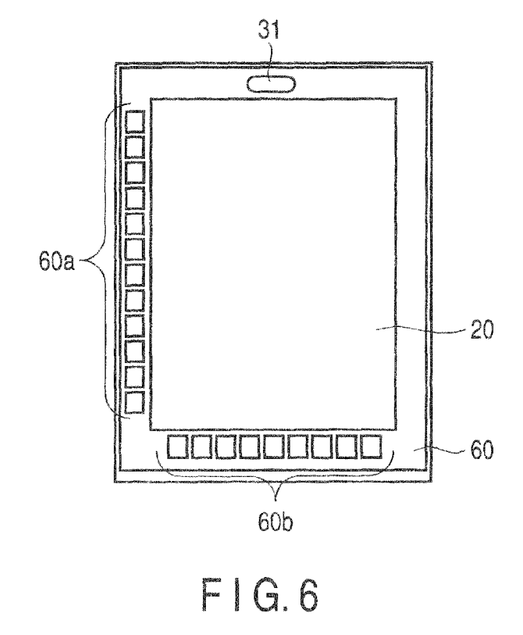
FIG. 6 is a view for explaining the mounting positions of the sensor modules of the portable information terminal apparatus shown in FIG. 1.

For example, in the above embodiment, as shown in FIG. 2, the two sensor modules 60a and 60b are provided on the same plane as the display unit 20. As shown in FIG. 5, however, one module may be provided on a side surface of the housing of the portable information terminal apparatus which is perpendicular to the display unit 20. Alternatively, as shown in FIG. 6, the touch sensor 60 with transparency may be provided so as to cover the entire surface on which the display unit 20 is mounted, and the two sensor modules 60a and 60b may be provided on areas which do not overlap the display unit 20.

Figure 7:
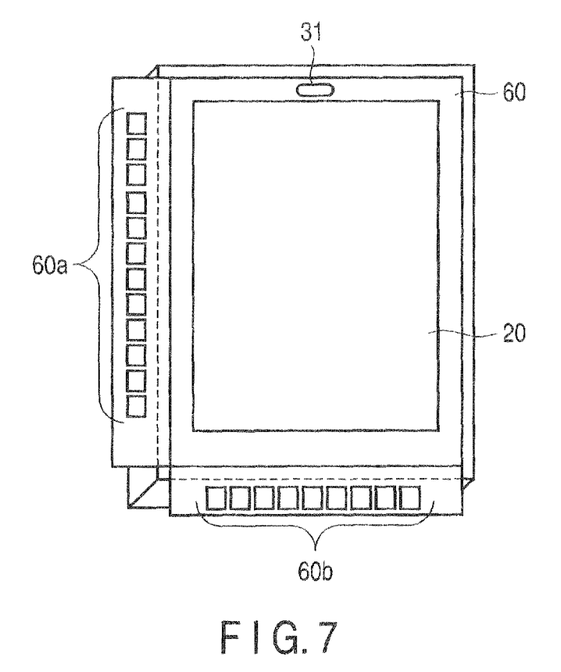
FIG. 7 is a view for explaining the mounting positions of the sensor modules of the portable information terminal apparatus shown in FIG. 1.

Furthermore, as shown in FIG. 7, this apparatus can have the following arrangement. The touch sensor 60 larger than the surface on which the display unit 20 may comprise a flexible, transparent material, and the two sensor modules 60a and 60b are provided on the portions of the touch sensor 60 which protrude from the above surface. These protruding portions are bent and fixed on the side surfaces of the housing.

The above embodiment has exemplified the arrangement having the sensor modules 60a and 60b each comprising a plurality of sensors arrayed linearly. However, the sensors may be two-dimensionally arranged instead of linearly. In this case, only a sensor which has detected contact and neighboring sensors are set to the active status, and the remaining sensors are set to the sleep status.

The above embodiment exemplifies a rectangular display area as the display area of the display unit 20. However, the display area can have a triangular shape, a square shape, a polygonal shape, a circular shape, an elliptical shape, or an irregular shape obtained by combining them.

The above embodiment can be variously modified and executed within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable information terminal apparatus comprising:
   display means for displaying information;
   a touch sensor module including an array of a plurality of touch sensors which detect user operation;
   display control means for controlling information displayed by the display means in accordance with a result detected by the touch sensor module; and
   touch sensor control means for controlling operation of the plurality of touch sensors by controlling a supply of power to the plurality of touch sensors and, when one of the plurality of touch sensors has detected an input from a user, continuing the supply of power to the one of the plurality of touch sensors and to a predetermined number of the plurality of touch sensors that are arranged near the one of the plurality of touch sensors while stopping the supply of power to all remaining touch sensors of the plurality of touch sensors.

2. The portable information terminal apparatus according to claim 1, wherein the touch sensor module comprises a plurality of touch sensors arrayed linearly.

3. The portable information terminal apparatus according to claim 2, wherein the display control means scrolls and displays information displayed by the display means when a plurality of linearly arrayed touch sensors sequentially detect user operation in a predetermined direction.

4. The portable information terminal apparatus according to claim 2, which further comprises direction detection means for detecting a top/bottom orientation of the display means, and in which
   the touch sensor module comprises at least two modules each having a plurality of touch sensors arrayed linearly, with the two modules being arrayed such that array directions thereof are perpendicular to each other, and
   the display control means performs control to cause the display means to display information in a proper top/bottom orientation in accordance with a detection result obtained by the direction detection means.

5. The portable information terminal apparatus according to claim 4, wherein the display control means scrolls and displays information displayed by the display means when a plurality of linearly arrayed touch sensors sequentially detect user operation in a predetermined direction.

6. The portable information terminal apparatus according to claim 4, wherein at least one module of the touch sensor modules is provided to be parallel to a display surface of the display means, and at least one module of the touch sensor modules is provided on a surface that is perpendicular to the display surface of the display means.

7. A mobile wireless terminal apparatus which wirelessly communicates with a base station apparatus accommodated in a mobile communication network, the apparatus comprising:
   display means for displaying information a touch sensor module including an array of a plurality of touch sensors which detect user operation;
   display control means for controlling information displayed by the display means in accordance with a result detected by the touch sensor module; and
   touch sensor control means for controlling operation of the plurality of touch sensors by controlling a supply of power to the plurality of touch sensors and, when one of the plurality of touch sensors has detected an input from a user, continuing the supply of power to the one of the plurality of touch sensors and to a predetermined number of the plurality of touch sensors that are arranged near the one of the plurality of touch sensors while stopping the supply of power to all remaining touch sensors of the plurality of touch sensors.

8. The mobile wireless terminal apparatus according to claim 7, wherein the touch sensor module comprises a plurality of touch sensors arrayed linearly.

9. The mobile wireless terminal apparatus according to claim 8, wherein the display control means scrolls and displays information displayed by the display means when a plurality of linearly arrayed touch sensors sequentially detect user operation in a predetermined direction.

10. The mobile wireless terminal apparatus according to claim 8, which further comprises direction detection means for detecting a top/bottom orientation of the display means, and in which
    the touch sensor module comprises at least two modules each having a plurality of touch sensors arrayed linearly, with the two modules being arrayed such that array directions thereof are perpendicular to each other, and
    the display control means performs control to cause the display means to display information in a proper top/bottom orientation in accordance with a detection result obtained by the direction detection means.

11. The mobile wireless terminal apparatus according to claim 10, wherein the display control means scrolls and displays information displayed by the display means when a plurality of linearly arrayed touch sensors sequentially detect user operation in a predetermined direction.

12. The mobile wireless terminal apparatus according to claim 10, wherein at least one module of the touch sensor modules is provided to be parallel to a display surface of the display means, and at least one module of the touch sensor modules is provided on a surface that is perpendicular to the display surface of the display means.

13. A touch sensor control method in a portable information terminal apparatus including display means for displaying information and a touch sensor module including an array of a plurality of touch sensors which detect user operation, the method comprising steps of:
    controlling information displayed by the display means in accordance with a result detected by the touch sensor; and
    controlling operation of the plurality of touch sensors by controlling a supply of power to the plurality of touch sensors and, when one of the plurality of touch sensors has detected an input from a user, continuing the supply of power to the one of the plurality of touch sensors and to a predetermined number of the plurality of touch sensors that are arranged near the one of the plurality of touch sensors while stopping the supply of power to all remaining touch sensors of the plurality of touch sensors.

14. The touch sensor control method according to claim 13, wherein the touch sensor module comprises a plurality of touch sensors arrayed linearly.

15. The touch sensor control method according to claim 14, wherein in the display control step, information displayed by the display means is scrolled and displayed when a plurality of linearly arrayed touch sensors sequentially detect user operation in a predetermined direction.

16. The touch sensor control method according to claim 14, which further comprises a step of detecting a top/bottom orientation of the display means, and in which
    the touch sensor module comprises at least two modules each having a plurality of touch sensors arrayed linearly, with the two modules being arrayed such that array directions thereof are perpendicular to each other, and
    in the display control step, control is performed to cause the display means to display information in a proper top/bottom orientation in accordance with a detection result obtained in the direction detection step.

17. The touch sensor control method according to claim 16, wherein in the display control step, information displayed by the display means is scrolled and displayed when a plurality of linearly arrayed touch sensors sequentially detect user operation in a predetermined direction.

18. The touch sensor control method according to claim 16, wherein at least one module of the touch sensor modules is provided to be parallel to a display surface of the display means, and at least one module of the touch sensor modules is provided on a surface that is perpendicular to the display surface of the display means.

* * * * *